US012276283B2

(12) United States Patent
Kabasawa et al.

(10) Patent No.: US 12,276,283 B2
(45) Date of Patent: Apr. 15, 2025

(54) INTEGRATED CONNECTOR BETWEEN FIRST AND SECOND VACUUM PUMPS CREATING A VAPOR PHASE REGION ENVIRONMENT

(71) Applicant: Edwards Japan Limited, Chiba (JP)

(72) Inventors: Takashi Kabasawa, Chiba (JP); Manabu Nonaka, Chiba (JP)

(73) Assignee: Edwards Japan Limited, Chiba (JP)

( * ) Notice: Subject to any disclaimer, the term of this patent is extended or adjusted under 35 U.S.C. 154(b) by 221 days.

(21) Appl. No.: 15/743,185

(22) PCT Filed: Jul. 1, 2016

(86) PCT No.: PCT/JP2016/069574

§ 371 (c)(1),
(2) Date: Jan. 9, 2018

(87) PCT Pub. No.: WO2017/014022

PCT Pub. Date: Jan. 26, 2017

(65) Prior Publication Data

US 2019/0120236 A1 Apr. 25, 2019

(30) Foreign Application Priority Data

Jul. 23, 2015 (JP) ................................ 2015-145473

(51) Int. Cl.
*F04D 19/04* (2006.01)
*F04B 37/16* (2006.01)
(Continued)

(52) U.S. Cl.
CPC ............ *F04D 19/042* (2013.01); *F04B 37/16* (2013.01); *F04C 25/02* (2013.01); *F04D 19/046* (2013.01);
(Continued)

(58) Field of Classification Search
CPC ...... F04D 25/16; F04D 19/046; F04D 17/168; F04D 19/044; F04D 25/0666;
(Continued)

(56) References Cited

U.S. PATENT DOCUMENTS 4,372,155 A * 2/1983 Butler .................. F02B 77/086 73/114.72
4,797,068 A * 1/1989 Hayakawa ............ F04C 23/005 417/205

(Continued)

FOREIGN PATENT DOCUMENTS

DE 10043783 A1 3/2002
EP 0541929 A1 5/1993

(Continued)

OTHER PUBLICATIONS

European Communication dated Feb. 11, 2019 and Supplementary European Search Report dated Feb. 1, 2019 for corresponding European Application No. EP16827586.

(Continued)

*Primary Examiner* — David N Brandt
(74) *Attorney, Agent, or Firm* — Theodore M. Magee; Westman, Champlin & Koehler, P.A.

(57) ABSTRACT

An exhausting system capable of preventing gas condensation and early overheat in a vacuum pump without causing an increase in the costs of the entire exhausting system and suitable for relaxing the operable conditions of the entire exhausting system including a flow rate at which gas is successively exhausted. An exhausting system is predicated on a constitution including: at least a first vacuum pump and a second vacuum pump connected in series; and a connecting portion disposed therebetween, the exhausting system exhausting gas containing a condensable gas via the vacuum pumps and the connecting portion. In the exhausting system, an environment inside the connecting portion is set to an (Continued)

environment having a vapor phase region below a vapor pressure curve of the condensable gas flowing through an inside of the connecting portion by providing the second vacuum pump near the first vacuum pump.

12 Claims, 13 Drawing Sheets

(51) Int. Cl.
*F04C 25/02* (2006.01)
*F04D 25/16* (2006.01)

(52) U.S. Cl.
CPC ........ *F04D 25/16* (2013.01); *F05D 2260/607* (2013.01)

(58) Field of Classification Search
CPC ............... F04D 15/0077; F04D 27/006; F04D 29/403; F04D 29/5853; F04D 29/661; F04B 37/16; F04B 37/14; F04B 37/18; F04B 37/20; F04C 25/02; F04C 19/001; F04C 19/004; F04C 19/005; F04C 23/003; F04C 25/00; F04C 28/02; F04C 2220/10; F04C 2220/12; F04C 29/047
See application file for complete search history.

(56) References Cited

U.S. PATENT DOCUMENTS 4,826,394 A * 5/1989 Lotz ...................... F04D 19/046 415/72
4,862,697 A * 9/1989 Tugal ...................... F04B 37/08 62/55.5
5,062,271 A * 11/1991 Okumura .............. F04D 19/046 62/55.5
5,092,740 A * 3/1992 Yamamura .............. F04D 25/16 417/423.4
5,118,251 A * 6/1992 Saulgeot ............... F04D 19/046 417/205
5,173,041 A * 12/1992 Niimura .............. F04C 29/0092 417/313
5,190,438 A * 3/1993 Taniyama ............. F04C 29/025 415/178
5,205,844 A * 4/1993 Morikawa .......... B01D 19/0063 96/6
5,387,090 A * 2/1995 Becker .................... F04B 23/06 417/205
5,478,210 A * 12/1995 Maruyama .......... F04C 29/0085 417/205
6,193,461 B1 * 2/2001 Hablanian ................. F04F 9/00 415/199.5
6,305,907 B1 * 10/2001 Becker .................... F04B 37/20 417/53
6,817,377 B1 * 11/2004 Reimer ............... F04D 27/0261 137/565.33
7,670,119 B2 * 3/2010 Durand ................. F04C 23/001 418/268
2005/0025640 A1 * 2/2005 Sekiguchi ............. F04D 17/168 417/423.4
2007/0020115 A1 * 1/2007 Huntley ................ F04D 19/046 417/423.4
2008/0063536 A1 * 3/2008 Koshizaka .............. F04C 29/04 417/462
2008/0078503 A1 * 4/2008 Ohmi ...................... F04C 25/02 427/372.2
2009/0104353 A1 * 4/2009 Shaw ...................... F04B 37/14 427/255.28
2011/0103934 A1 * 5/2011 Ohtachi ................ F04D 19/042 415/118
2013/0259712 A1 * 10/2013 Kawasaki ............... F04D 25/16 417/201
2014/0271106 A1 * 9/2014 Alessandro ......... F04D 27/0261 415/118

FOREIGN PATENT DOCUMENTS

| | | | |
|---|---|---|---|
| JP | S60247075 | A | 12/1985 |
| JP | S62291479 | A | 12/1987 |
| JP | H0612794 | | 2/1994 |
| JP | S6028298 | | 9/1995 |
| JP | H09219172 | A | 8/1997 |
| JP | H09310696 | A | 12/1997 |
| JP | 2005120955 | A | 5/2005 |
| JP | 2013209928 | A | 10/2013 |
| JP | 2014029130 | A | 2/2014 |
| WO | 2012046495 | A1 | 4/2012 |

OTHER PUBLICATIONS

PCT International Search Report dated Sep. 20, 2016 for corresponding PCT Application No. PCT/JP2016/069574.
PCT International Written Opinion dated Sep. 20, 2016 for corresponding PCT Application No. PCT/JP2016/069574.
European Communication dated Sep. 15, 2021 for corresponding European application Serial No. EP16827586.5, 7 pages.

* cited by examiner

INTEGRATED CONNECTOR BETWEEN FIRST AND SECOND VACUUM PUMPS CREATING A VAPOR PHASE REGION ENVIRONMENT

CROSS-REFERENCE OF RELATED APPLICATION

This Application is a Section 371 National Stage Application of International Application No. PCT/JP2016/069574, filed Jul. 1, 2016, which is incorporated by reference in its entirety and published as WO 2017/014022 A1 on Jan. 26, 2017 and which claims priority of Japanese Application No. 2015-145473, filed Jul. 23, 2015.

BACKGROUND

The present invention relates to an exhausting system used as a unit for exhausting gas from process chambers and other chambers in semiconductor manufacturing equipment, flat panel display manufacturing equipment, and solar panel manufacturing equipment. In particular, the present invention makes it possible to prevent gas condensation and early overheat in a vacuum pump without causing an increase in the costs of an entire exhausting system and is suitable for relaxing the operable conditions of the entire exhausting system including a flow rate of gas, at which the gas is exhausted successively.

As shown in FIG. 12, an exhausting system S100 of this type conventionally has, for example, first and second vacuum pumps P101 and P102 connected in series and is configured to exhaust gas containing a condensable gas via the vacuum pumps P101 and P102 and a connecting portion C1 between the vacuum pumps P101 and P102 (specifically, pipe laying PL6 connecting both the vacuum pumps P101 and P102 and a valve VL1 provided halfway through the pipe laying PL6). Further, a turbomolecular pump is adopted as the first vacuum pump P101, and a known positive displacement pump representing a roughing vacuum pump is adopted as the second vacuum pump P102.

In the present application, a condensing property represents the property of changing a phase from gas to solid or liquid with pressure or temperature according to the characteristics of a vapor pressure curve.

In addition, in the conventional exhausting system S100, the turbomolecular pump (first vacuum pump P101) is attached to, for example, a process chamber in a clean room to be used since the turbomolecular pump generates less vibrations due to its structural feature that a rotating body inside the pump is supported by magnetic bearings in a non-contact manner.

On the other hand, the positive displacement pump (second pump P102) is often installed at a position (for example, below the clean room) separated several meters away from the chamber and the turbomolecular pump to be used since the positive displacement pump is likely to generate vibrations due to its structural feature that rotating bodies are not supported inside the pump in a non-contact manner. Under such a using mode, the following measures 1 to 3 are often taken in consideration of a pipe laying loss.

Measures 1. As the pipe laying PL6 connecting the turbomolecular pump (first vacuum pump P101) with the positive displacement pump (second vacuum pump P102), thick pipe laying PL6 having a diameter of about 75 mm to 100 mm is used.

Measures 2. In order to set the exit pressure of the pipe laying PL6 at a low level, a large positive displacement pump (generally, a Roots type pump) is used as the second vacuum pump P102.

Measures 3. In order to allow an exhausting operation even if the pipe laying PL6 has high exit pressure, a combination pump WP in FIG. 13 is used as the first vacuum pump P101.

The combination pump WP in FIG. 13 is known as a pump in which the functions of a turbomolecular pump and the functions of a thread groove pump are combined with each other (see, for example, Japanese Patent Application Laid-open No. 2013-209928).

As shown in FIG. 13, the turbomolecular pump function unit (blade exhausting mechanism 50) of the combination pump WP has a plurality of rotor blades 51 provided on the outer peripheral surface of a rotor 54 and a plurality of stator blades 52 fixed onto the inner peripheral surface of a pump case 55 accommodating the rotor 54 arranged in multiple stages. The rotor blades 51 integrally rotating with the rotor 54 and the stationary stator blades 52 impart momentum in a prescribed direction to gas molecules. Thus, the gas molecules inside a chamber are exhausted from a suction port 56 to an outlet port 57. In this regard, the turbomolecular pump operates in the same manner.

Meanwhile, when the above measures 2 are taken, the inlet pressure of the pipe laying PL6 connecting the turbomolecular pump (first vacuum pump P101) with the positive displacement pump (second vacuum pump P102) becomes relatively high (inlet pressure of the pipe laying PL6=pressure near the outlet port 57 of the turbomolecular pump). Gas exhausted by the vacuum pumps P101 and P102 contains a condensable gas. Therefore, when the condensable gas contained in the gas condenses beyond its condensing pressure in the process of the condensing of the gas and the condensed gas component is accumulated inside the pumps, problems such as blocking of a gas flowing path, a reduction in exhausting performance, and overheat of the turbomolecular pump occur. In addition, the problem of breaking the rotor blades also occurs when the accumulated matter of the condensed gas component contacts the rotor blades of the turbomolecular pump.

As measures against condensing gas to avoid the above problems, temperature near the outlet port 57 of the turbomolecular pump (first vacuum pump P101) is kept at the condensing temperature of the condensable gas or more to prevent gas from condensing near the outlet port 57 (see, for example, Japanese Patent Application Laid-open No. 2014-29130).

However, in the turbomolecular pump (first vacuum pump P101), heat generated by its exhausting operation (frictional heat generated mainly when gas contacts the rotor blades or the like) is stored in the rotor blades. When the above conventional measures against condensing gas, i.e., the heat insulation of the turbomolecular pump is performed under such a condition, insulated heat is further stored in the rotor blades of the turbomolecular pump. Therefore, the problem of so-called early overheat occurs in which the temperature of the rotor blades of the turbomolecular pump is likely to become high and reaches temperature close to its heat-resistant temperature at relatively early time. Thus, the operable conditions of the entire exhausting system such as a flow rate of gas capable of being successively exhausted are disadvantageously restricted.

Meanwhile, in order to solve the above problem of early overheat, it is assumed to adopt a method for performing differential heating. In the differential heating, a heat necessary portion is insulated from the other portion (heat unnecessary portion) and heated to effectively prevent the heat unnecessary portion from being heated more than necessary.

However, when the differential heating is performed as measures against the early overheat in the turbomolecular pump (first vacuum pump P101), it is necessary to provide complicated insulating structures and heating structures to differentially insulate and heat only a high-pressure portion at which gas is likely to particularly condense in the turbomolecular pump, specifically a portion near the outlet port 57 of the turbomolecular pump. Therefore, an increase in the costs of the entire exhausting system S100 is inevitable.

The discussion above is merely provided for general background information and is not intended to be used as an aid in determining the scope of the claimed subject matter. The claimed subject matter is not limited to implementations that solve any or all disadvantages noted in the background.

SUMMARY OF THE INVENTION

The present invention has been made in order to solve the above problems and has an object of providing an exhausting system capable of preventing gas condensation and early overheat in a vacuum pump without causing an increase in the costs of the entire exhausting system and is suitable for relaxing the operable conditions of the entire exhausting system such as a flow rate of gas capable of being successively exhausted.

In order to achieve the above object, an embodiment of the present invention provides an exhausting system including: as at least two pumps, a first vacuum pump and a second vacuum pump connected in series; and a connecting portion disposed therebetween, the exhausting system exhausting gas containing a condensable gas via the vacuum pumps and the connecting portion, wherein an environment inside the connecting portion is set to be an environment included in a vapor phase region below a vapor pressure curve of the condensable gas flowing through an inside of the connecting portion by providing the second vacuum pump near the first vacuum pump.

In the embodiment of the present invention, the first vacuum pump and the second vacuum pump may be connected and integrated with each other.

In the embodiment of the present invention, the connecting portion may be provided with a vibration controlling structure.

In the embodiment of the present invention, the first vacuum pump may be positioned upstream of the second vacuum pump and composed of a turbomolecular pump.

In the embodiment of the present invention, the turbomolecular pump may have a blade exhausting mechanism that exhausts the gas with a rotor blade and a stator blade and is structured so as not to have a drag pump mechanism.

In the embodiment of the present invention, the environment inside the connecting portion may be set to be an environment included in the vapor phase region below the vapor pressure curve of the condensable gas flowing through the inside of the connecting portion by decreasing pressure inside the connecting portion without increasing temperature inside the connecting portion.

In the embodiment of the present invention, the second vacuum pump may be positioned downstream of the first vacuum pump and composed of a positive displacement pump.

In the embodiment of the present invention, the positive displacement pump may have a heater for heating an inside of the positive displacement pump, a temperature sensor for measuring temperature inside the positive displacement pump, and a temperature controlling circuit for controlling heating temperature of the heater by using a measurement value obtained by the temperature sensor.

In the embodiment of the present invention, the positive displacement pump may have an inverter circuit and be capable of changing a rotational speed by the inverter circuit.

In the embodiment of the present invention, the positive displacement pump may have a low-speed operating function to be capable of operating at a rotational speed lower than a rotational speed in a normal operation thereof.

In the embodiment of the present invention, the exhausting system may have a structure in which a controlling circuit for at least one of the first vacuum pump and the second vacuum pump is accommodated in a housing and the housing is connected and integrated with at least one of the vacuum pumps.

In the embodiment of the present invention, a thermal insulating unit may be provided at a connecting portion between one of the first vacuum pump and the second vacuum pump and the housing of the controlling circuit.

In the embodiment of the present invention, a third vacuum pump may be arranged and connected downstream of the second vacuum pump.

In the embodiment of the present invention, an environment inside the second vacuum pump may be set to be an environment included in a solid phase region above the vapor pressure curve of the condensable gas flowing through the inside of the second vacuum pump.

In the embodiment of the present invention, an environment inside a second connecting portion connecting the second vacuum pump with the third vacuum pump may be set to be an environment included in a solid phase region above the vapor pressure curve of the condensable gas flowing through the inside of the second connecting portion.

In the embodiment of the present invention, one of a storing tank and a trap for trapping a condensed or coagulated gas component may be provided at the second connecting portion connecting the second vacuum pump with the third vacuum pump.

As the specific configuration of an exhausting system according to an embodiment of the present invention, the environment inside the connecting portion between both the vacuum pumps is set to be an environment to be included in a vapor phase region below the vapor pressure curve of a condensable gas flowing through the inside of the connecting portion by providing a second vacuum pump near a first vacuum pump. Therefore, it is possible to prevent gas from condensing inside the connecting portion between both the vacuum pumps and near the connecting portion (for example, near the outlet port of the first vacuum pump close to the connecting portion). In addition, it is not necessary to take measures to actively keep the inside and near the connecting portion warm with a heater, i.e., conventional measures against condensing gas. Thus, the insulated heat is not additionally stored in the components of the vacuum pumps (for example, the rotor blades of a turbomolecular pump). As a result, it is possible to provide the exhausting system capable of preventing so-called early overheat and suitable for relaxing the operable conditions of the entire exhausting system such as a flow rate of gas capable of being successively exhausted.

On the other hand, when both the conventional measures against condensing gas and the measures in the embodiment of the present invention (the above environment setting in the embodiment of the present invention) are taken, it is possible to apply gas types not substantially prevented from condensing and not capable of being exhausted.

In addition, in order to prevent the early overheat, the embodiment of the present invention adopts a configuration in which the second vacuum pump is installed near the first vacuum pump instead of conventional differential heating and may remove a heater used as the conventional measures against condensing gas. Therefore, it is possible to achieve a reduction in the number of components and a reduction in the costs of the entire exhausting system and achieve the energy saving of the entire system with a reduction in the use power of the heater.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DESCRIPTION OF THE PREFERRED EMBODIMENTS

Hereinafter, referring to the accompanying drawings, the best mode for carrying out the present invention will be described in detail.

Figure 1:
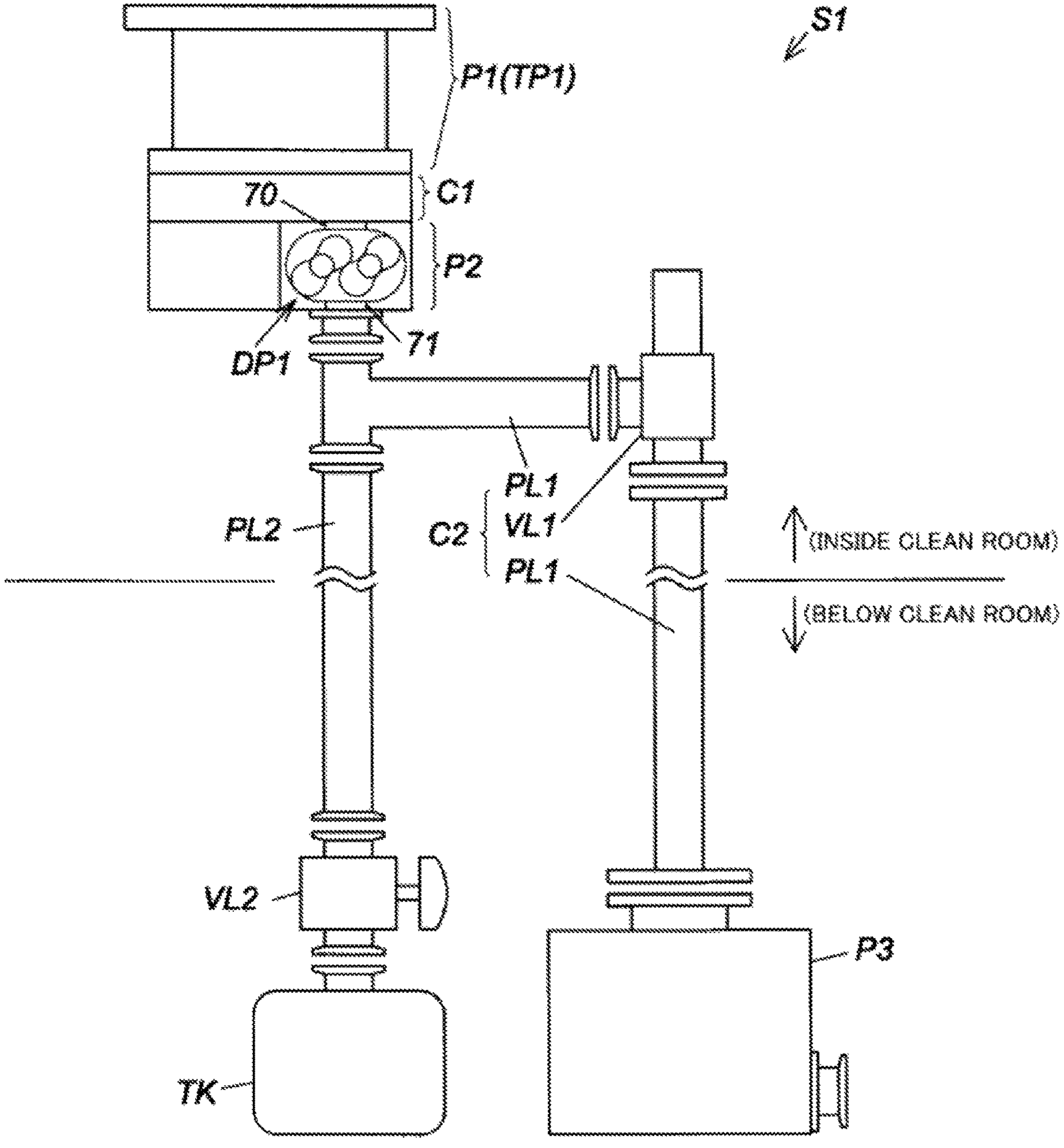
FIG. 1 is a configuration diagram of an exhausting system according to an embodiment of the present invention.
Figure 2:
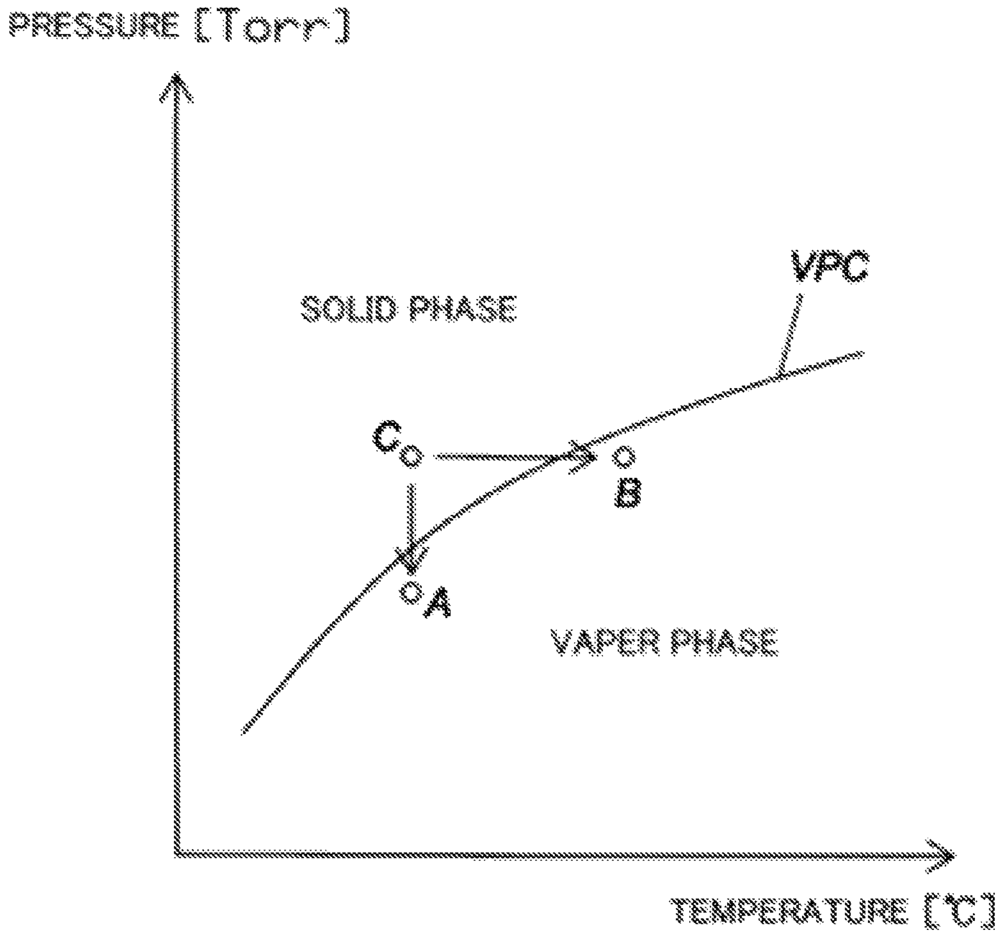
FIG. 2 is a vapor pressure curve diagram for describing the operating principle of the exhausting system to which the present invention is applied.

FIG. 1 is a configuration diagram of an exhausting system according to an embodiment of the present invention, and FIG. 2 is a vapor pressure curve diagram for describing the operating principle of the exhausting system to which the present invention is applied.

An exhausting system S1 in FIG. 1 has, as at least two pumps, first and second vacuum pumps P1 and P2 connected in series and exhausts gas containing a condensable gas via the vacuum pumps P1 and P2 and a connecting portion C1 between the vacuum pumps P1 and P2.

The gas to be exhausted by the exhausting system S1 exists inside a chamber (not shown) to which the first vacuum pump P1 is connected and transfers in the order of the first vacuum pump P1, the connecting portion C1, and the second vacuum pump P2 from the chamber to be exhausted outside the chamber.

For example, a process chamber constituting semiconductor manufacturing equipment, flat panel display equipment, solar panel manufacturing equipment, or the like is assumed as the chamber, but the exhausting system S1 in FIG. 1 may be adopted as a device for exhausting the gas from a chamber other than such a process chamber.

As a basic technological idea of measures to prevent gas condensation inside the connecting portion C1 and near the connecting portion C1 (specifically, near a gas outlet port closest to the connecting portion C1 in the entire first vacuum pump P1), in the exhausting system S1 in FIG. 1 the environment inside the connecting portion C1 is set to be an environment to be included in a vapor phase region below a vapor pressure curve VPC (see FIG. 2) of the condensable gas flowing through the inside of the connecting portion C1 by providing the second vacuum pump P2 near the first vacuum pump P1. The setting of the environment will be called "measures against condensing gas in the present invention" below.

The installation of the second vacuum pump P2 near the first vacuum pump P1 as described above results in the shortening of the distance of the connecting portion C1 (for example, connecting pipe laying or a connecting path) connecting the first vacuum pump P1 with the second vacuum pump P2 and also results in a reduction in the fluid frictional resistance of the gas flowing through the connecting portion C1 such as pipe laying resistance and path resistance at the connecting portion C1. Therefore, it is possible to realize the above "measures against condensing gas in the present invention" since pressure inside and near the connecting portion C1 may be kept low substantially like pressure near the outlet port of the first vacuum pump P1.

Hereinafter, the "measures against condensing gas in the present invention" will be described in detail using FIG. 2.

In a vapor pressure curve diagram in FIG. 2, VPC represents the vapor pressure curve of the condensable gas flowing through the inside of the connecting portion C1.

In addition, a point A in FIG. 2 represents, in the exhausting system S1 taking the "measures against condensing gas in the present invention," the relationship between pressure and temperature inside the connecting portion C1 connecting the two vacuum pumps P1 and P2 to each other and near the outlet port of the first vacuum pump P1 communicating with the connecting portion C1.

A point B in FIG. 2 is shown as a first comparative example and represents the relationship between pressure and temperature near the outlet port of the first vacuum pump P101 constituting the exhausting system S100 in the conventional exhausting system S100 (see FIG. 12) taking the "conventional measures against condensing gas" described above.

Figure 12:
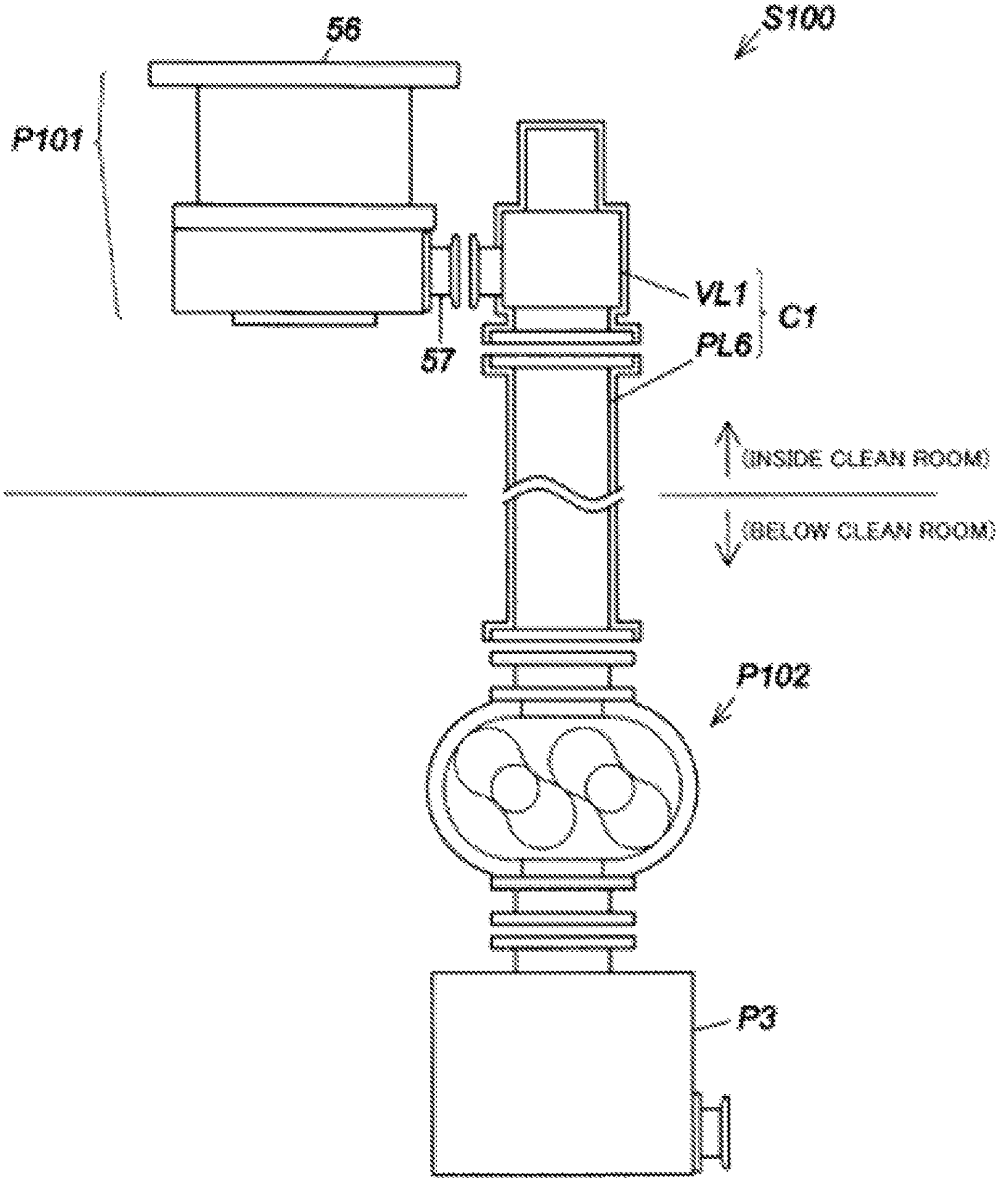
FIG. 12 (PRIOR ART)
FIG. 12 is a configuration diagram of a conventional exhausting system.
Figure 13:
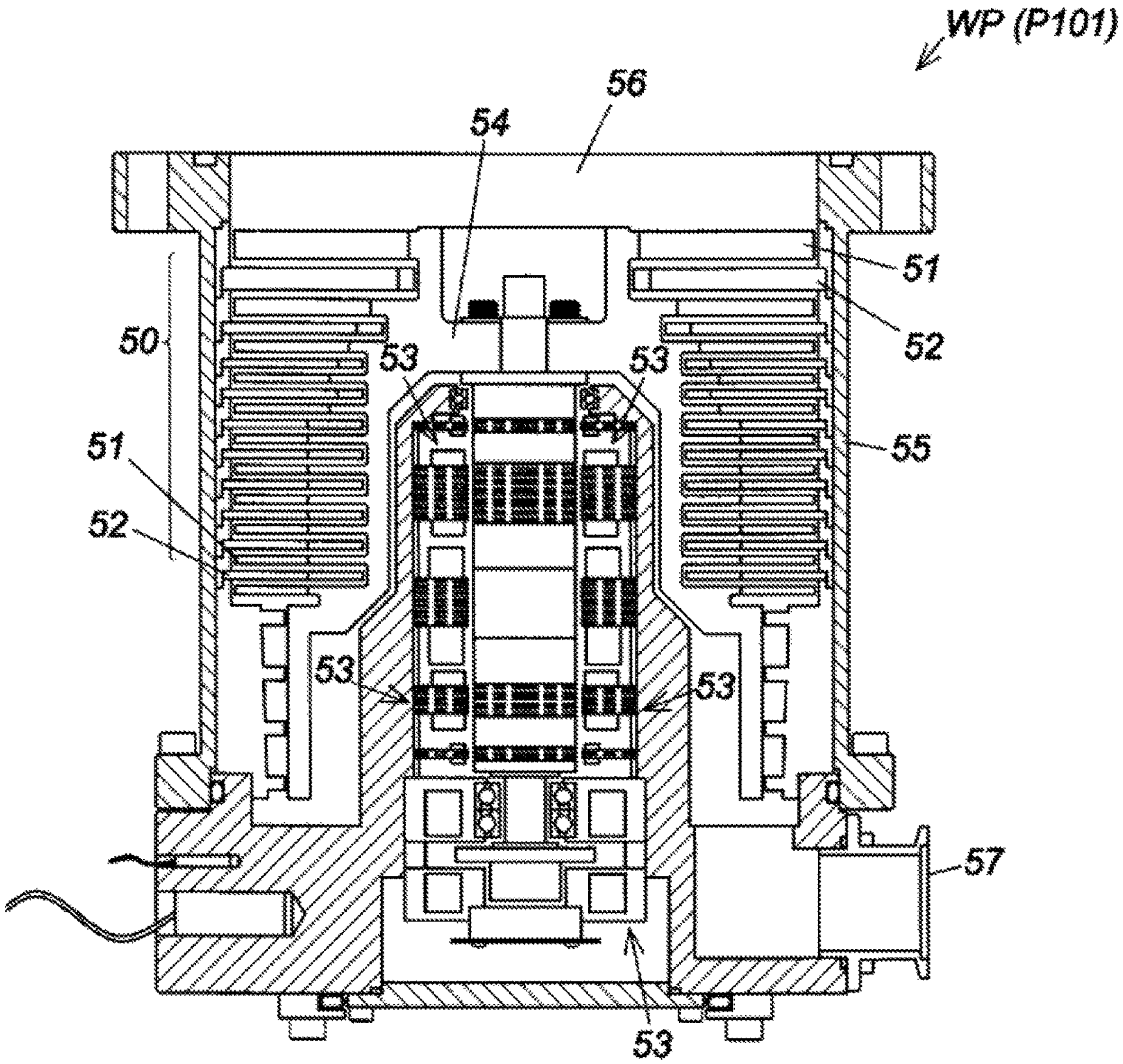
FIG. 13 (PRIOR ART)
FIG. 13 is a configuration diagram of a combination pump.

A point C in FIG. 2 is shown as a second comparative example and represents the relationship between pressure and temperature near the outlet port of the first vacuum pump P101 constituting the exhausting system S100 in a case in which the conventional exhausting system S100 in FIG. 12 does not take the conventional measures against condensing gas.

Referring to the point C in FIG. 2 shown as the second comparative example, the environment near the outlet port of the first vacuum pump P101 is included in a solid phase region above the vapor pressure curve VPC of the condensable gas flowing through the inside of the first vacuum pump P101 in a case in which the exhausting system S100 does not take the measures against condensing gas. Therefore, gas condenses near the outlet port of the first vacuum pump P101.

On the other hand, referring to the point A in FIG. 2, the environment inside the connecting portion C1 connecting the two vacuum pumps P1 and P2 to each other and near the outlet port of the first vacuum pump P1 communicating with the connecting portion C1 is included in the vapor phase region below the vapor pressure curve VPC of the condensable gas flowing through the inside of the connecting portion C1 in a case in which the exhausting system S1 takes the "measures against condensing gas in the present invention." Therefore, gas does not condense near the outlet port of the vacuum pump P1.

Meanwhile, referring to the point B in FIG. 2, the environment near the outlet port of the first vacuum pump P101 is included in the vapor phase region below the vapor pressure curve VPC of the condensable gas flowing through the outlet port even in a case in which the conventional exhausting system S100 takes the "conventional measures against condensing gas." Therefore, gas hardly condenses near the outlet port of the vacuum pump P101.

However, in the "conventional measures against condensing gas," the environment near the outlet port of the first vacuum pump P101 is set an environment included in the vapor phase region below the vapor pressure curve VPC by increasing temperature inside the connecting portion C1 without decreasing pressure inside the connecting portion C1 between the two vacuum pumps P101 and P102 in the conventional exhausting system S100 shown in FIG. 12. Therefore, as described in "Description of the Related Art," the problem of so-called early overheat is likely to occur in the first vacuum pump P101 in the conventional exhausting system S100 taking the "conventional measures against condensing gas."

On the other hand, in the "measures against condensing gas in the present invention," the environment inside the connecting portion C1 and near the outlet port of the first vacuum pump P1 is set to be an environment included in the vapor phase region below the vapor pressure curve VPC of the condensable gas flowing through the inside of the connecting portion C1 and the outlet port in the exhausting system S1 in FIG. 1, and the exhausting system S1 takes a method for decreasing the pressure inside the connecting portion C1 without increasing the temperature inside the connecting portion C1 as a specific method for performing the setting. Therefore, the problem of early overheat hardly occurs in the exhausting system S1 taking the "measures against condensing gas in the present invention."

Note that, as other measures against condensing gas in the present invention, it is also possible to take both measures to increase the temperature inside the connecting portion and measures to decrease the pressure inside the connecting portion C1 described above to set the environment inside the connecting portion C1 to be included in the vapor phase region.

Figure 3:
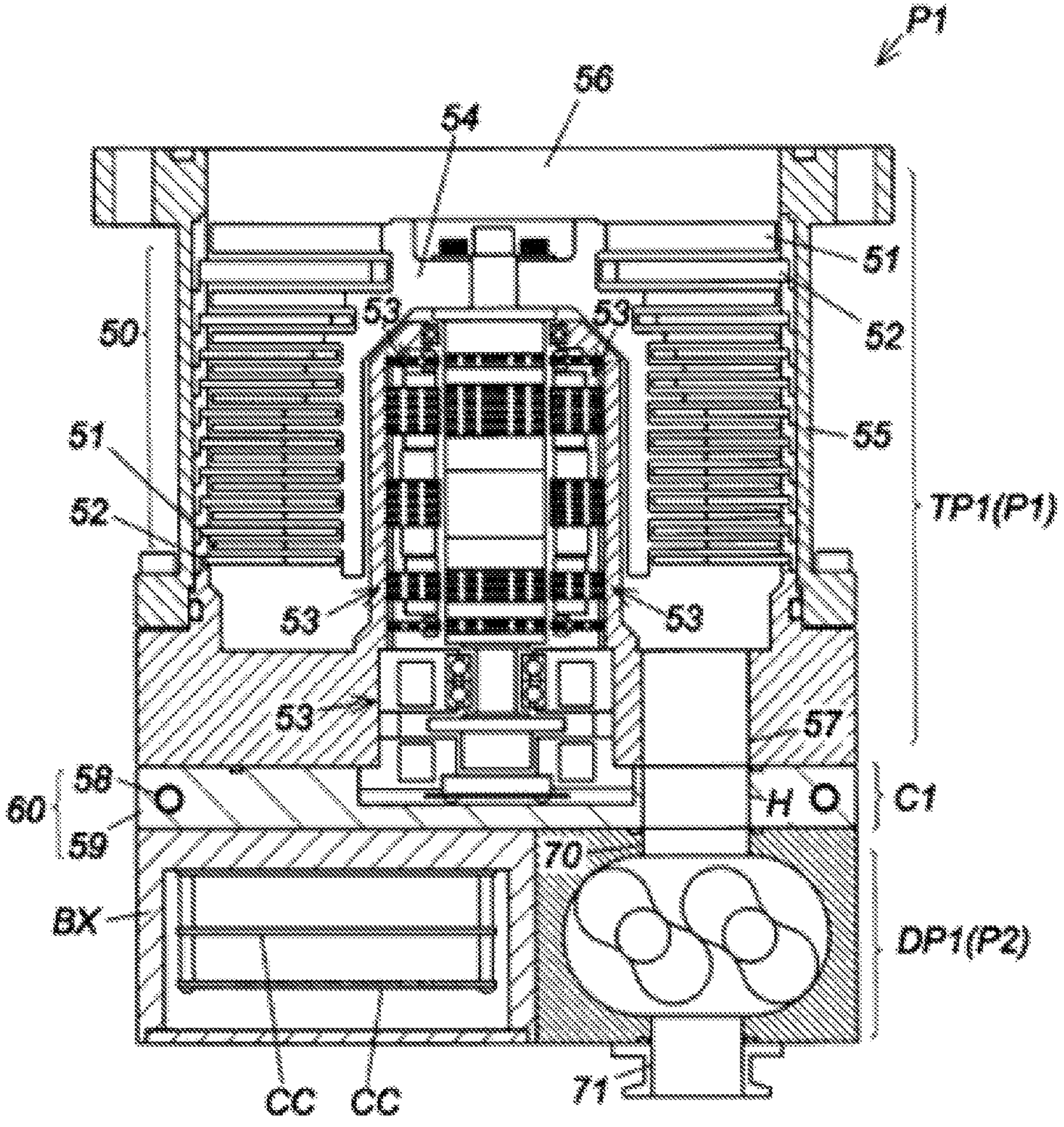
FIG. 3 is a cross-sectional diagram of a turbomolecular pump adopted as a first vacuum pump in the exhausting system in FIG. 1.

Referring to FIG. 1, the first vacuum pump P1 is positioned upstream of the second vacuum pump P2, and specifically a turbomolecular pump TP1 shown in FIG. 3 is adopted as the first vacuum pump P1.

As shown in FIG. 3, the turbomolecular pump TP1 serving as the first vacuum pump P1 has a blade exhausting mechanism 50 exhausting gas with rotor blades 51 and stator blades 52 and is structured so as not to have various types of drag pump mechanisms such as a Holweck type, a Siegbahn type, and a Gaede type.

A first reason why the turbomolecular pump TP1 is structured so as not to have a drag pump mechanism is that the drag pump mechanism has a narrow flow path and a narrow gap through which gas flows, and that the flow path and the gap are easily blocked with the accumulation of a precipitation portion. In addition, as a second reason for not having a drag pump mechanism, the drag pump mechanism increases the fluid frictional resistance of gas when the gas flows through a narrow flow path and a narrow gap described above and increases the pressure of the gas. Thus, it becomes difficult to set the environment inside the connecting portion C1 to be included in the vapor phase region with a decrease in the pressure of the gas. That is, the "measures against condensing gas in the present invention" are hardly taken when the turbomolecular pump TP1 has the drag pump mechanism.

Referring to FIG. 3, the turbomolecular pump TP1 serving as the first vacuum pump P1 has, as its specific pump components, a rotor 54 supported by magnetic bearings 53, the plurality of rotor blades 51 provided on the outer peripheral surface of the rotor 54, and the plurality of stator blades 52 fixed onto the inner peripheral surface of a pump case 55 accommodating the rotor 54. The turbomolecular pump TP1 forms the blade exhausting mechanism 50 with the plurality of rotor blades 51 and the plurality of stator blades 52 arranged in multiple stages. In the turbomolecular pump TP1, the rotor blades 51 integrally rotate with the rotor 54, and the rotating rotor blades 51 and the stationary stator blades 52 impart momentum in a prescribed direction to gas molecules. Thus, the gas molecules inside the chamber not shown are exhausted from a suction port 56 to the outlet port 57.

In addition, the turbomolecular pump TP1 serving as the first vacuum pump P1 has, at its lower part, a cooling unit 60 for suppressing the temperature of the entire pump due to heat generated by its exhausting operation, the cooling unit 60 being composed of a water cooling plate 59 including a water cooling pipe 58 or the like.

Referring to FIG. 1, the second vacuum pump P2 is positioned downstream of the first vacuum pump P1 (turbomolecular pump TP1) and composed of a positive displacement pump DP1.

The exhausting system S1 in FIG. 1 adopts a Roots type pump (see FIG. 3) as a specific example of the positive displacement pump DP1 but is not limited to the same. As other examples of the positive displacement pump, the exhausting system S1 may adopt various types of positive displacement pumps other than the Roots type pump such as a screw type pump and a claw type pump.

The positive displacement pump DP1 may have a keep-warm function. In this case, the positive displacement pump DP1 has a heater (not shown) for heating the inside of the pump DP1, a temperature sensor (not shown) for measuring temperature inside the pump DP1, and a temperature controlling circuit (not shown) for controlling (for example, feedback control) the heating temperature of the heater using a measurement value obtained by the temperature sensor to realize the keep-warm function.

In addition, the positive displacement pump DP1 has an inverter circuit not shown (a unit for converting alternate current into alternate current again). With the inverter circuit, the positive displacement pump DP1 is capable of changing its rotational speed.

Moreover, the positive displacement pump DP1 has a low-speed operating function to be capable of operating at a rotational speed lower than a rotational speed in its normal operation. The low-speed operating function may be realized on the basis of the rotational speed changing function of the inverter circuit.

As shown in FIGS. 1 and 3, the first vacuum pump P1 and the second vacuum pump P2 are connected and integrated with each other via the connecting portion C1 (pump connecting and integrating structure). In the pump connecting and integrating structure, a communicating hole H (see FIG. 3) is provided in the connecting portion C1 between the vacuum pumps P1 and P2. As shown in FIG. 3, one end of the communicating hole H communicates with the outlet port 57 of the first vacuum pump P1, and the other end thereof communicates with an inlet port 70 of the second vacuum pump P2. Thus, gas exhausted from the first vacuum pump P1 is fed to the side of the second vacuum pump P2 via the communicating hole H of the connecting portion C1.

The communicating hole H preferably has a large hole diameter over its entirety. Alternatively, a plurality of communicating holes may be provided. This is because it is possible to easily take the "measures against condensing gas in the present invention" in these cases since the pressure inside the connecting portion C1 and near the outlet port 57 of the first vacuum pump P1 communicating with the connecting portion C1 may be kept low with a reduction in the fluid frictional resistance of gas flowing through the communicating hole H.

Meanwhile, when the pump connecting and integrating structure is adopted, there is a likelihood of vibrations generated by the second vacuum pump P2 being transmitted to the first vacuum pump P1 and the chamber positioned upstream of the first vacuum pump P1 via the connecting portion C1. For example, when the positive displacement pump DP1 like the Roots type pump is adopted as the second vacuum pump P2, relatively large vibrations are generated from a timing gear for synchronizing the bearing portion of a rotating body and the rotating body, or the like.

On the other hand, in the turbomolecular pump TP1 adopted as the first vacuum pump P1, a rotating body composed of the rotor 54 and the rotor blades 51 is supported by the magnetic bearings 53 in a non-contact manner as shown in FIG. 3. In the supported state, the gap between the rotating body and a stator portion around the rotating body (specifically, the gap between the rotor blades 51 and the stator blades 52) is controlled to be kept narrow.

Therefore, when the vibrations generated by the second vacuum pump P2 are transmitted to the operating turbomolecular pump TP1 (first vacuum pump P1) as described above, the rotating body contacts and collides with the surrounding stator portion to be broken inside the turbomolecular pump TP1, which may result in the breakdown of the turbomolecular pump TP1. Accordingly, it is necessary to reliably prevent the vibrations from being transmitted from the positive displacement pump DP1 (second vacuum pump P2) to the turbomolecular pump TP1 (first vacuum pump P1).

In addition, the suction port 56 of the turbomolecular pump TP1 is connected to the chamber, and precise machining or an operation such as semiconductor etching is performed inside the chamber. Therefore, it is also necessary to reliably prevent the vibrations generated by the positive displacement pump DP1 (second vacuum pump P2) from being finally transmitted to the chamber via the turbomolecular pump TP1 (first vacuum pump P1).

Figure 4:
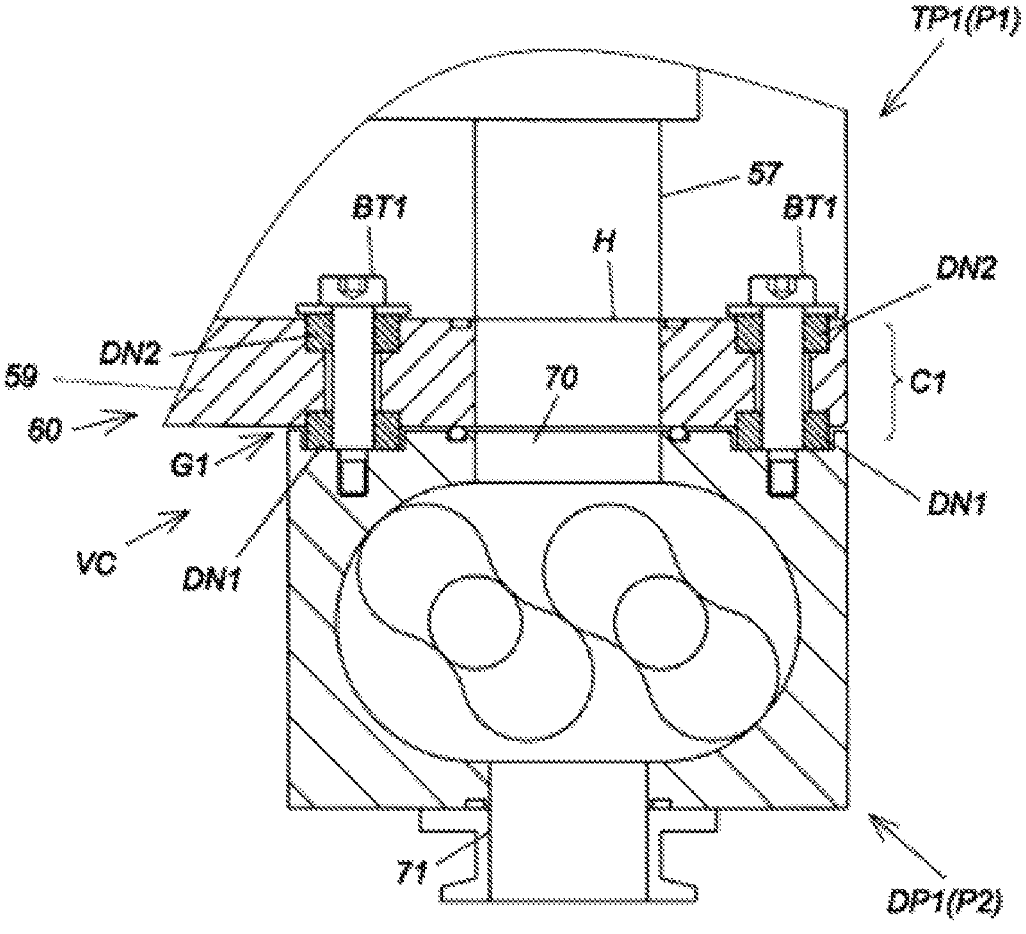
FIG. 4 is a cross-sectional diagram for describing vibration controlling structures.
Figure 5:
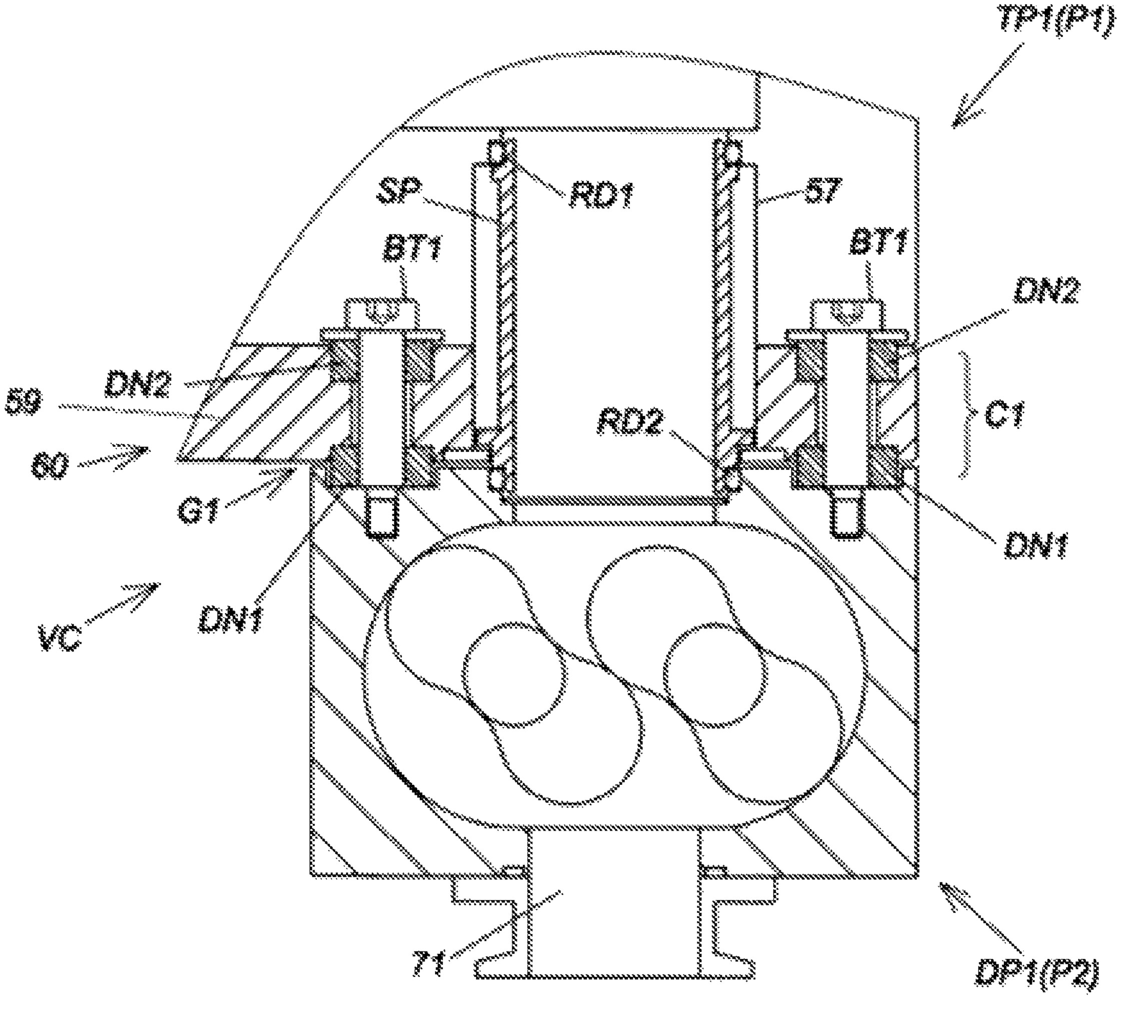
FIG. 5 is a cross-sectional diagram for describing the vibration controlling structures.

In order to address the above problems, vibration controlling structures VC in FIG. 4 or FIG. 5 are installed in the connecting portion C1 between the first vacuum pump P1 and the second vacuum pump P2 in the exhausting system S1 in FIG. 1 as units for effectively preventing a phenomenon in which the vibrations generated by the second vacuum pump P2 are transmitted to the first vacuum pump P1 and the chamber positioned upstream of the first vacuum pump P1. Specific examples of the vibration controlling structures VC will be described as the following vibration controlling structures 1-1 to 1-3.

Vibration Controlling Structure 1-1

In a vibration controlling structure 1-1, as shown in FIG. 4 or FIG. 5, the first vacuum pump P1 and the second vacuum pump P2 are fastened and connected to each other by bolts BT1 and vibration absorbing members DN1 and DN2 such as rubber bushes are interposed at the fastening and connecting portions to absorb the vibrations generated by the second vacuum pump P2.

When the first vacuum pump P1 and the second vacuum pump P2 are connected to each other via the cooling unit 60, i.e., when the cooling unit 60 is interposed at the connecting portion C1 between the first vacuum pump P1 and the second vacuum pump P2, the vibration absorbing members DN1 and DN2 may be interposed between the first vacuum pump P1 and the cooling unit 60 and between the second vacuum pump P2 and the cooling unit 60, respectively, as shown in FIG. 4 or FIG. 5.

By the interposition of the vibration absorbing members DN1 and DN2, a prescribed gap G1 is formed between the second vacuum pump P2 and the cooling unit 60. The gap G1 may be provided between the first vacuum pump P1 and the cooling unit 60. Alternatively, it is also possible to remove one of the vibration absorbing members according to a size of the vibrations generated by the second vacuum pump P2.

The vibration absorbing members DN1 and DN2 of this type are preferably made of a material having high heat resistance and low hardness like, for example, silicon rubber.

Vibration Controlling Structure 1-2

In a vibration controlling structure 1-2, as shown in FIG. 4 or FIG. 5, stepped bolts are adopted as the bolts BT1 and a crushing degree of the vibration absorbing members DN1 and DN2 is appropriately managed to prevent the excessive fastening of the bolts BT1 and the disappearance of the gap G1 due to the vibrations generated by the second vacuum pump P2 and effectively exhibit a vibration absorbing effect with the gap G1 and the vibration absorbing members DN1 and DN2. This is because, when the gap G1 disappears due to an inappropriate crushing degree of the vibration absorbing members DN1 and DN2, the second vacuum pump P2 and the cooling unit 60 directly contact each other or the first vacuum pump P1 and the cooling unit 60 directly contact each other to wear off the vibration controlling effect with the gap G1 and the vibration absorbing members DN1 and DN2.

Vibration Controlling Structure 1-3

In a vibration controlling structure 1-3, as shown in FIG. 5, a cylindrical spacer SP is inserted into the communicating hole H provided in the connecting portion C1 between the two vacuum pumps P1 and P2, and annular elastic members RD1 and RD2 such as O-rings are attached to the upper-end outer peripheral surface and the lower-end outer peripheral surface of the spacer SP. In addition, the spacer SP is set to be put in a floating state in the communicating hole H and the outlet port 57 of the first vacuum pump P1 via the annular elastic members RD1 and RD2. Thus, the spring rigidity of a vibration transmitting path via the surrounding of the communicating hole H reduces, whereby the transmission of the vibrations of the second vacuum pump P2 to the first vacuum pump P1 is alleviated. Note that the spacer SP may be replaced by a bellows.

Specifically, in the alleviation of the transmission of the vibrations by the vibration controlling structure 1-3, the entire second vacuum pump P2 moves, when the vibrations are generated by the second vacuum pump P2, like a conical pendulum with the upper-side annular elastic member RD1 as a base point to alleviate the transmission of the vibrations from the second vacuum pump to the first vacuum pump.

Note that the vibration controlling structure VC in FIG. 4 includes the vibration controlling structure 1-1 and the vibration controlling structure 1-2, and that the vibration controlling structure VC in FIG. 5 includes the vibration controlling structure 1-3, the vibration controlling structure 1-1, and the vibration controlling structure 1-2.

Referring to FIG. 3, the first vacuum pump P1 and the second vacuum pump P2 have respective controlling circuits CC as units for controlling the supply of power to the pumps, the number of the rotations of the pumps, or the like. As a specific installation structural example of the controlling circuits CC, a housing BX serving as a circuit accommodating box is installed at a position below the first vacuum pump P1 and next to the second vacuum pump P2, and the controlling circuits CC are accommodated in the housing BX in the exhausting system S1 in FIG. 1. Thus, a structure (hereinafter called a "circuit and pump integrated structure") is configured in which the controlling circuits CC are connected and integrated with the first and second vacuum pumps P1 and P2.

Figure 6:
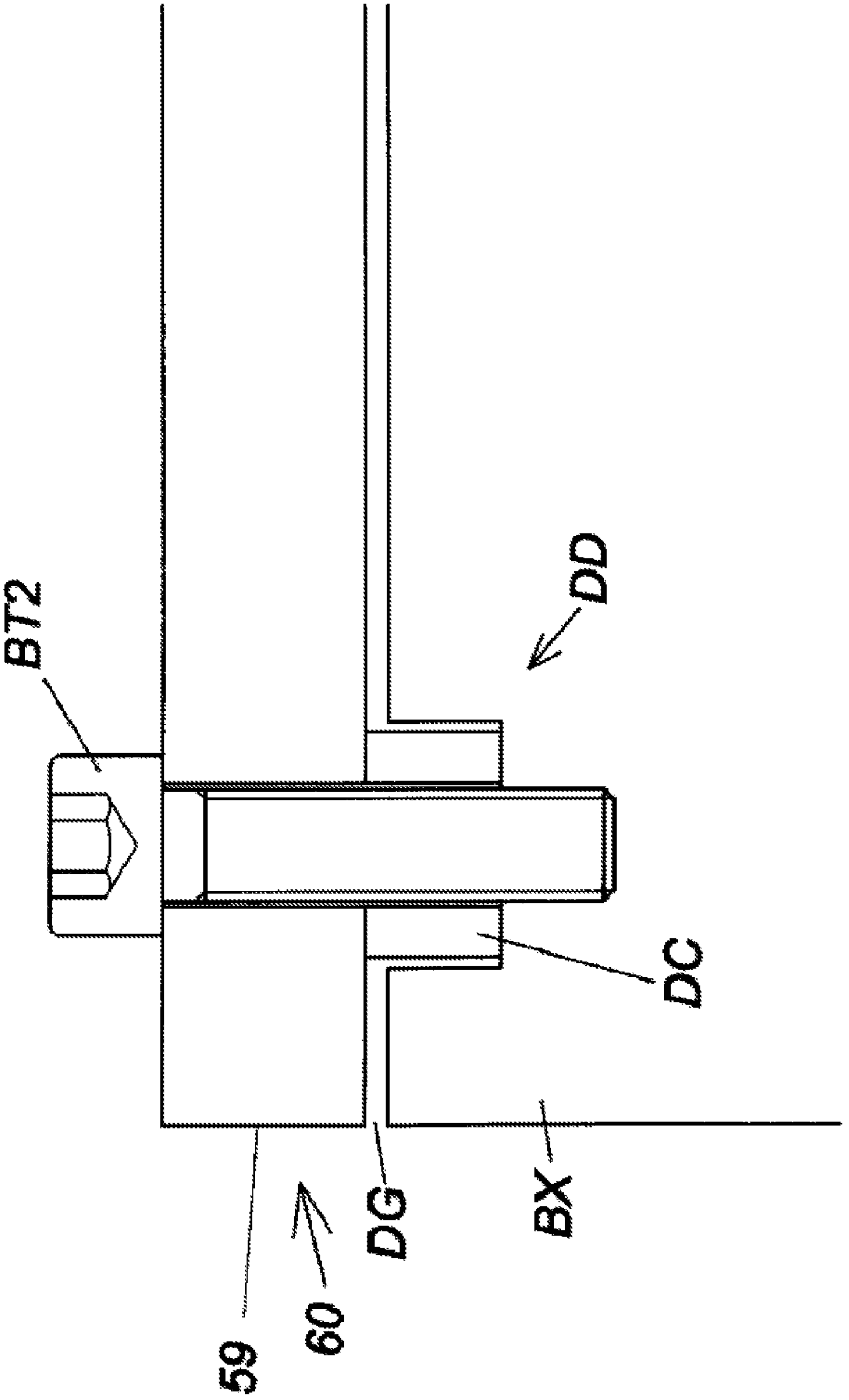
FIG. 6 is a cross-sectional diagram for describing a thermal insulating unit.

At the connecting portion between the first vacuum pump P1 and the housing BX of the controlling circuits CC, specifically, at the position between the cooling unit 60 provided below the first vacuum pump P1 and the housing BX, a thermal insulating unit DD is provided as shown in FIG. 6 as a unit for preventing the occurrence of water condensation inside the housing BX.

Meanwhile, in the circuit and pump integrated structure, the housing BX is also cooled by heat conduction when the first vacuum pump P1 is cooled by the cooling unit 60. As a result, water condensation may occur inside the housing BX. In this case, there is a likelihood of a malfunction or a breakdown occurring in the controlling circuits CC due to water droplets caused by the water condensation. Therefore, the thermal insulating unit DD cuts off a heat conducting path to prevent the occurrence of the water condensation.

As a specific configuration example of the thermal insulating unit DD, the exhausting system S1 in FIG. 1 adopts, as shown in FIG. 6, both a system in which an air space (thermal insulating space) DG for insulation is provided between the water cooling plate 59 constituting the water cooling unit 60 and the housing BX and a system in which a collar (thermal insulating collar) DC for insulation is provided around a bolt BT2 fastening the water cooling plate 59 and the housing BX together. Where necessary, it is also possible to remove one of these systems. The material of the thermal insulating collar DC may include, but not limited to, stainless steel or ceramics.

The circuit and pump integrated structure is not limited to the above example, but a structure may be adopted in which the controlling circuit CC of at least one of the first vacuum pump P1 and the second vacuum pump P2 is accommodated in the housing BX and the housing BX is connected and integrated with at least one of the vacuum pumps (P1 or P2).

In the exhausting system S1 in FIG. 1, a third vacuum pump P3 is further arranged and connected downstream of the second vacuum pump P2.

In the exhausting system S1 in FIG. 1, a connecting portion C2 (second connecting portion) connecting the second vacuum pump P2 with the third vacuum pump P3 is configured to include pipe laying PL1 connecting the vacuum pump P2 with the vacuum pump P3, a valve VL1 provided halfway through the pipe laying PL1, or the like, and gas exhausted from an outlet port 71 of the second vacuum pump P2 transfers to the third vacuum pump P3 via the pipe laying PL1 and the valve VL1.

In the configuration having the third vacuum pump P3 like the exhausting system S1 in FIG. 1, the following first gas condensing environment or second gas condensing environment may be adopted.

First Gas Condensing Environment

The first gas condensing environment is an environment in which the environment inside the second vacuum pump P2 is included in the solid phase region above the vapor pressure curve VPC of the condensable gas flowing through the inside of the second vacuum pump P2. For example, the setting of the environment may be realized in such a manner that temperature inside the second vacuum pump P2 is kept at prescribed temperature by the keep-warm function of the second vacuum pump P2 to make pressure corresponding to the prescribed temperature exceed the vapor pressure curve VPC of the condensable gas inside the second vacuum pump P2.

Second Gas Condensing Environment

The second gas condensing environment is an environment in which the environment inside the connecting portion C2 connecting the second vacuum pump P2 with the third vacuum pump P3 is included in the solid phase region above the vapor pressure curve VPC of the condensable gas flowing through the connecting portion C2. For example, the setting of the environment may be realized in such a manner that temperature inside the connecting portion C2 is kept at prescribed temperature by the keep-warm function of the connecting portion C2 to make pressure corresponding to the prescribed temperature exceed the vapor pressure curve VPC of the condensable gas inside the connecting portion C2.

When the first gas condensing environment is adopted, gas condenses inside the second vacuum pump P2, specifically inside a gas exhausting flow path formed by the gap between the rotating bodies and the stator portion around the rotating bodies and the condensed gas component adheres to the inside of the gas exhausting flow path. It is possible to quickly and effectively remove the adhering condensed gas component making use of the mechanical structural characteristics of the second vacuum pump P2.

That is, the second vacuum pump P2 is the positive displacement pump DP1 like the Roots type pump as described above and is so structured that the rotating bodies rotate with a small gap maintained between the rotating bodies and the stator portion around the rotating bodies, or rotate with a small gap maintained between the rotating bodies. Therefore, when the thickness of the adhering condensed gas component becomes larger than the gap around the rotating bodies, the condensed gas component is scraped away by the rotating bodies to be reliably removed. In order to prevent the scraped-away condensed gas component from flowing back to the upstream side, it is preferable to set the temperature of the second vacuum pump P2 so that the pressure exceeds the vapor pressure curve VPC of the condensable gas near the outlet port 71 of the second vacuum pump P2.

When the first gas condensing environment is adopted, it is assumed to install, as a specific method for collecting the scraped-away condensed gas component described above, a precipitation matter collecting tank TK via straight-type pipe laying PL2 right below the outlet port 71 of the second vacuum pump P2 as shown in, for example, FIG. 1. According to the method, the scraped-away condensed gas component falls in the precipitation matter collecting tank TK under its own weight to be collected by way of the pipe laying PL2 and a valve VL2 halfway through the pipe laying PL2.

In addition, when the first gas condensing environment is adopted, it is preferable to perform, in stopping the second vacuum pump P2, a so-called idling operation in which the second vacuum pump P2 operates at low speed until its temperature decreases and the heat shrinkage of the components of the pump, i.e., the rotating bodies and the stator member around the rotating bodies completely ends to perform the above scraping-away operation. This is because a problem such as locking of the rotating bodies of the second vacuum pump P2 due to the unscraped-away condensed gas component is prevented by the idling operation.

Figure 7:
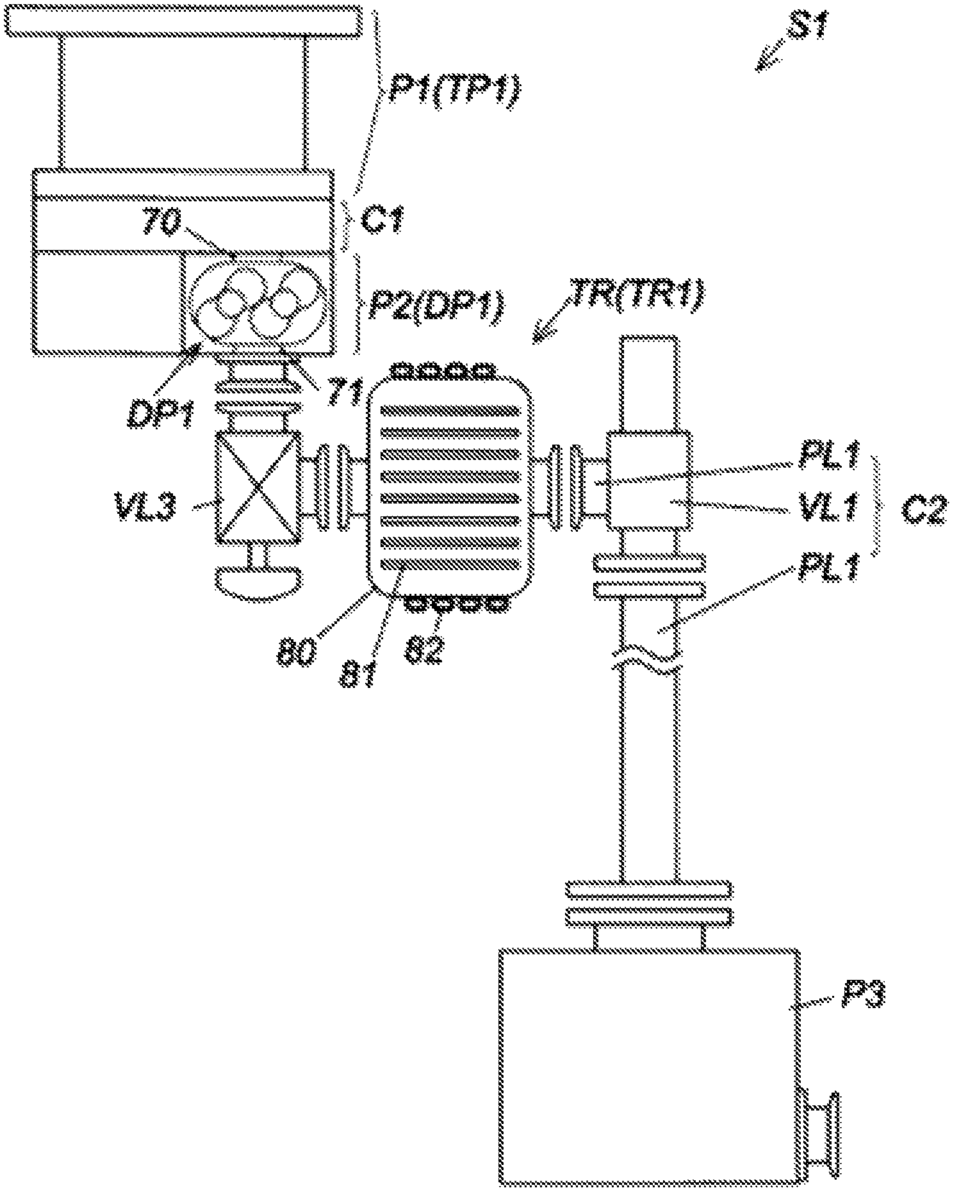
FIG. 7 is an explanatory diagram of an example in which a trapping unit is applied to the exhausting system in FIG. 1.

On the other hand, when the second gas condensing environment is adopted, gas condenses on the downstream side of the second vacuum pump P2, specifically at the connecting portion C2 connecting the second vacuum pump P2 with the third vacuum pump P3. Therefore, as shown in FIG. 7, a trapping unit TR such as a storing tank and a trap TR1 for trapping the condensed or coagulated (or solidified) gas component is provided halfway through the pipe laying PL1 constituting the connecting portion C2. Thus, the condensed gas component may be trapped.

That is, when the environment inside the trapping unit TR, for example, inside the trap TR1 or the storing tank is included in the solid phase region above the vapor pressure curve VPC of the condensable gas flowing through the trap TR1 or the storing tank, gas condenses inside the trapping unit TR such as the trap TR1 and the storing tank and the condensed gas component may be trapped by the trapping unit TR.

The trap TR1 has, as shown in, for example, FIG. 7, a pressure container 80, a plurality of plate-shaped members 81 (trapping plates) installed inside the pressure container 80, and a refrigerant flowing path 82 through which a refrigerant (cooling water or the like) for cooling the inside of the pressure container 80 and the plate-shaped members 81 flows. The trap TR1 may be so configured as to cool the inside of the pressure container 80 and the plate-shaped members 81 with the refrigerant and thus the condense condensable gas inside the pressure container 80 to make the condensed gas component adhere to the plate-shaped members 81. In this case, the plate-shaped members 81 are installed in parallel with the flow of the gas. This is because the inhibition of the flow of the gas by the plate-shaped members 81 is prevented. The storing tank may be configured in the same manner as the trap TR1.

In the maintenance of the trap TR1, it is only necessary to close a manual valve VL3 provided halfway through the pipe laying PL1 constituting the connecting portion C2 and a magnetic valve VL1 and open the pressure container 80 to extract and replace the plate-shaped members 81. On this occasion, although not shown in the figure, it is possible to doubly provide the valves VL3 to perform the extraction and replacement of the plate-shape members 81 in a state in which the condensed gas component accumulated in the trap TR1 is contained in the pressure container 80.

Figure 8:
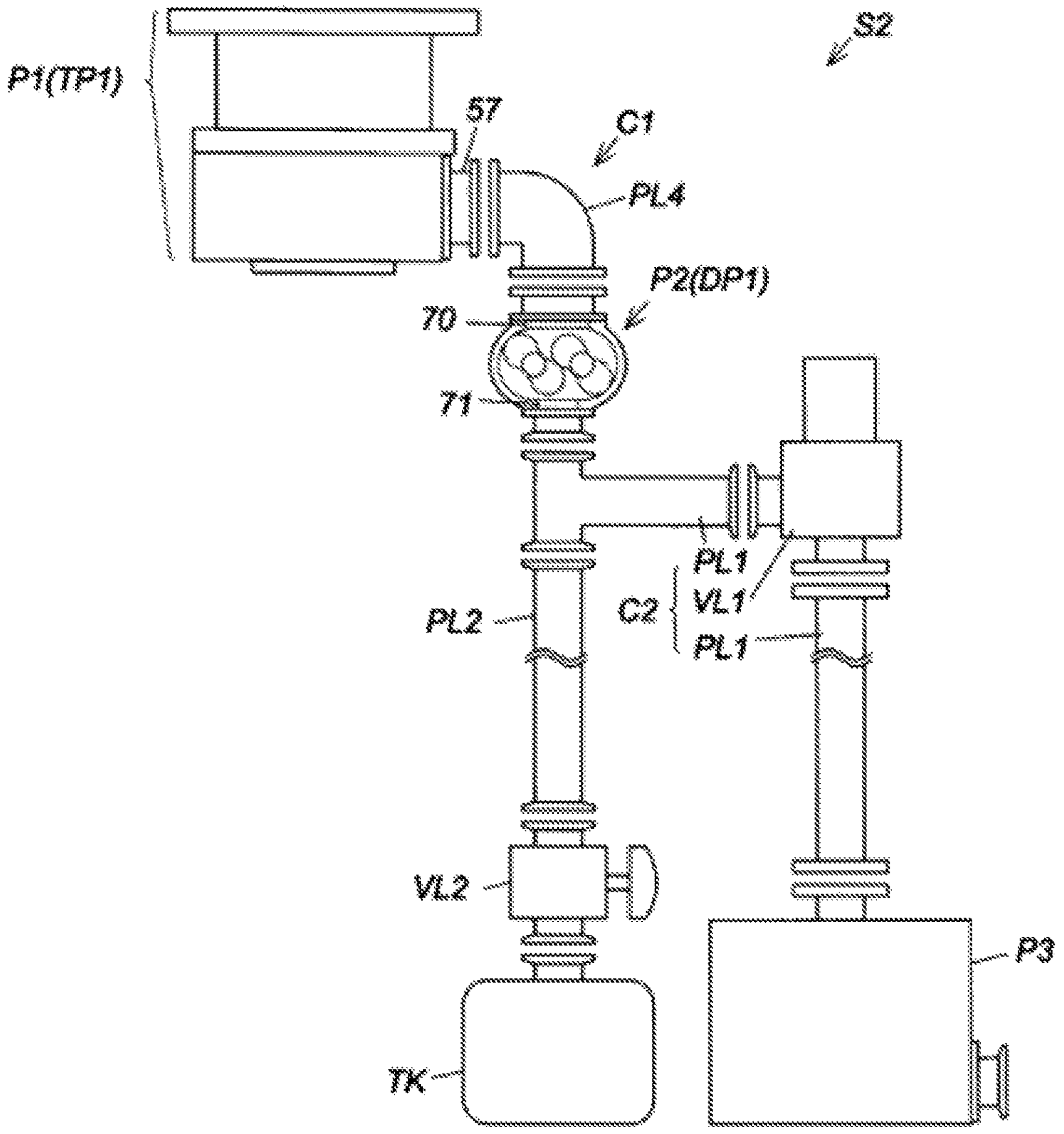
FIG. 8 is a configuration diagram of an exhausting system according to another embodiment of the present invention.
Figure 9:
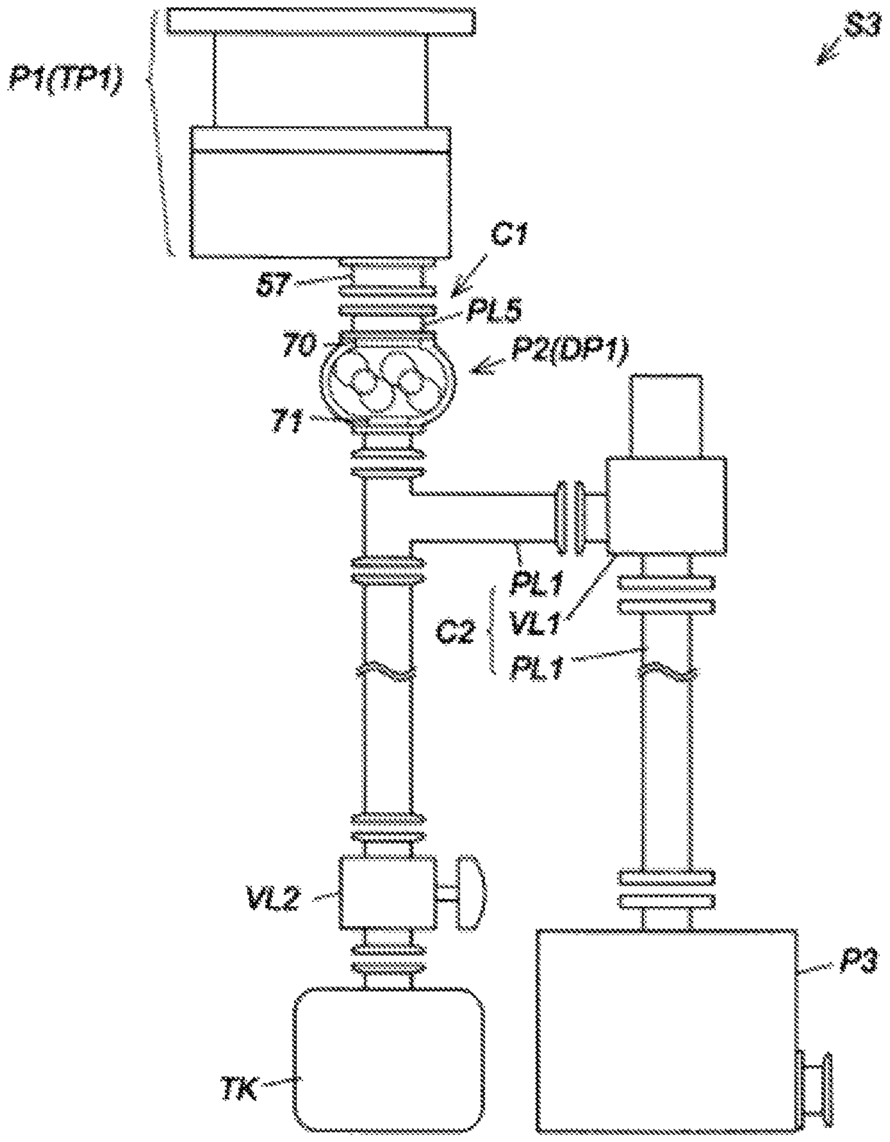
FIG. 9 is a configuration diagram of an exhausting system according to another embodiment of the present invention.

FIGS. 8 and 9 are configuration diagrams of exhausting systems according to other embodiments of the present invention.

The exhausting system S1 in FIG. 1 adopts the configuration in which the first vacuum pump P1 and the second vacuum pump P2 are connected and integrated with each other via the connecting portion C1. Instead of this, a configuration in which a first vacuum pump P1 and a second vacuum pump P2 are separated from each other and the second vacuum pump P2 is connected in series near the separated first vacuum pump P1 via a connecting portion C1 like an exhausting system S2 shown in FIG. 8 may be adopted. In this case, the connecting portion C1 is composed of pipe laying PL4, and gas transfers from the first vacuum pump P1 to the second vacuum pump P2 via the pipe laying PL4.

Figure 10:
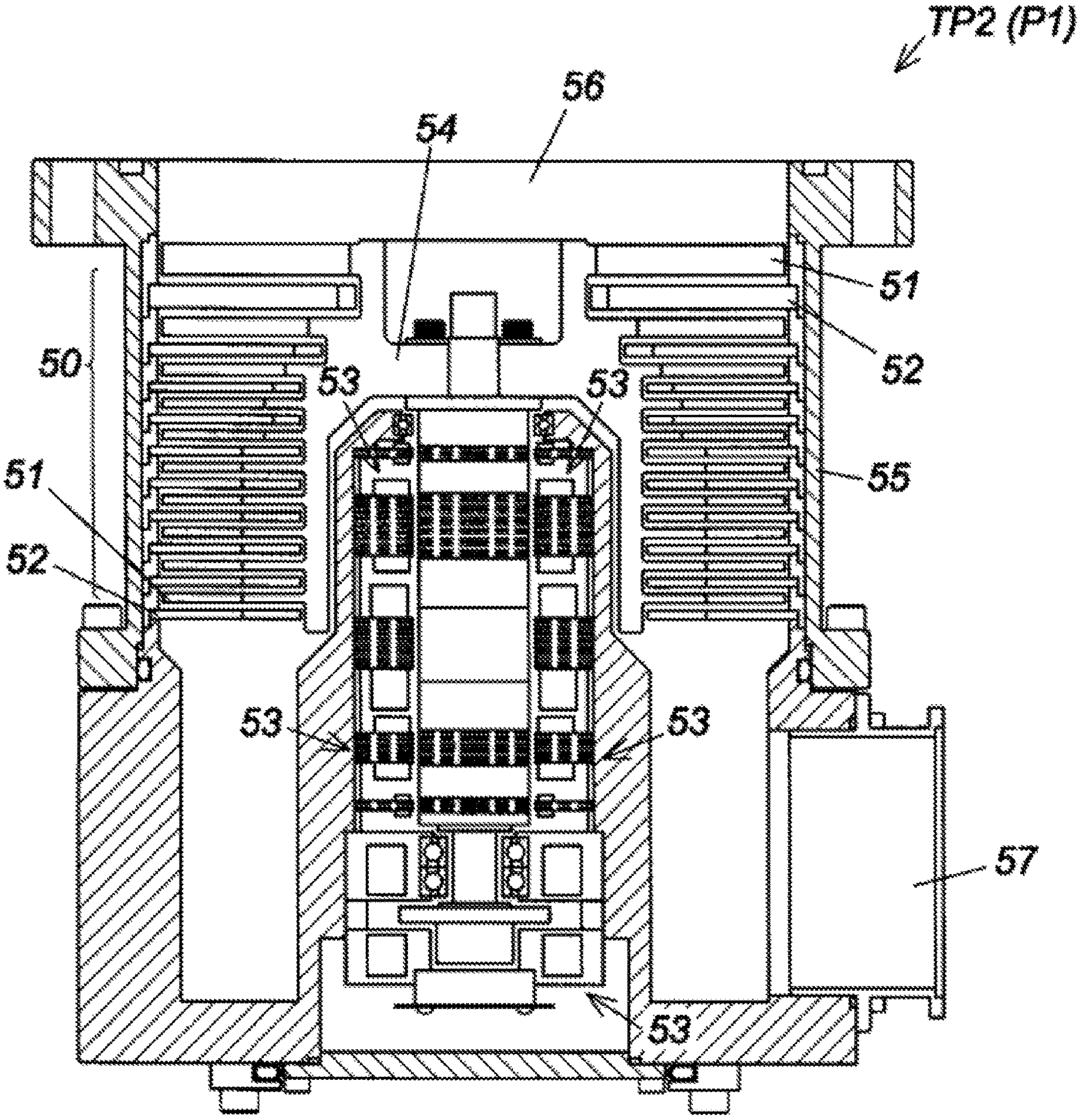
FIG. 10 is a cross-sectional diagram of a turbomolecular pump adoptable as a first vacuum pump constituting the exhausting system according to the embodiment of the present invention.

The exhausting system S2 in FIG. 8 may adopt a turbomolecular pump TP2 having a large-diameter outlet port 57 shown in FIG. 10 as the first vacuum pump P1. Note that the turbomolecular pump TP2 shown in FIG. 10 has basically the same configurations as those of the turbomolecular pump TP1 shown in FIG. 3. Therefore, the same members will be denoted by the same symbols, and their detailed descriptions will be omitted.

Figure 11:
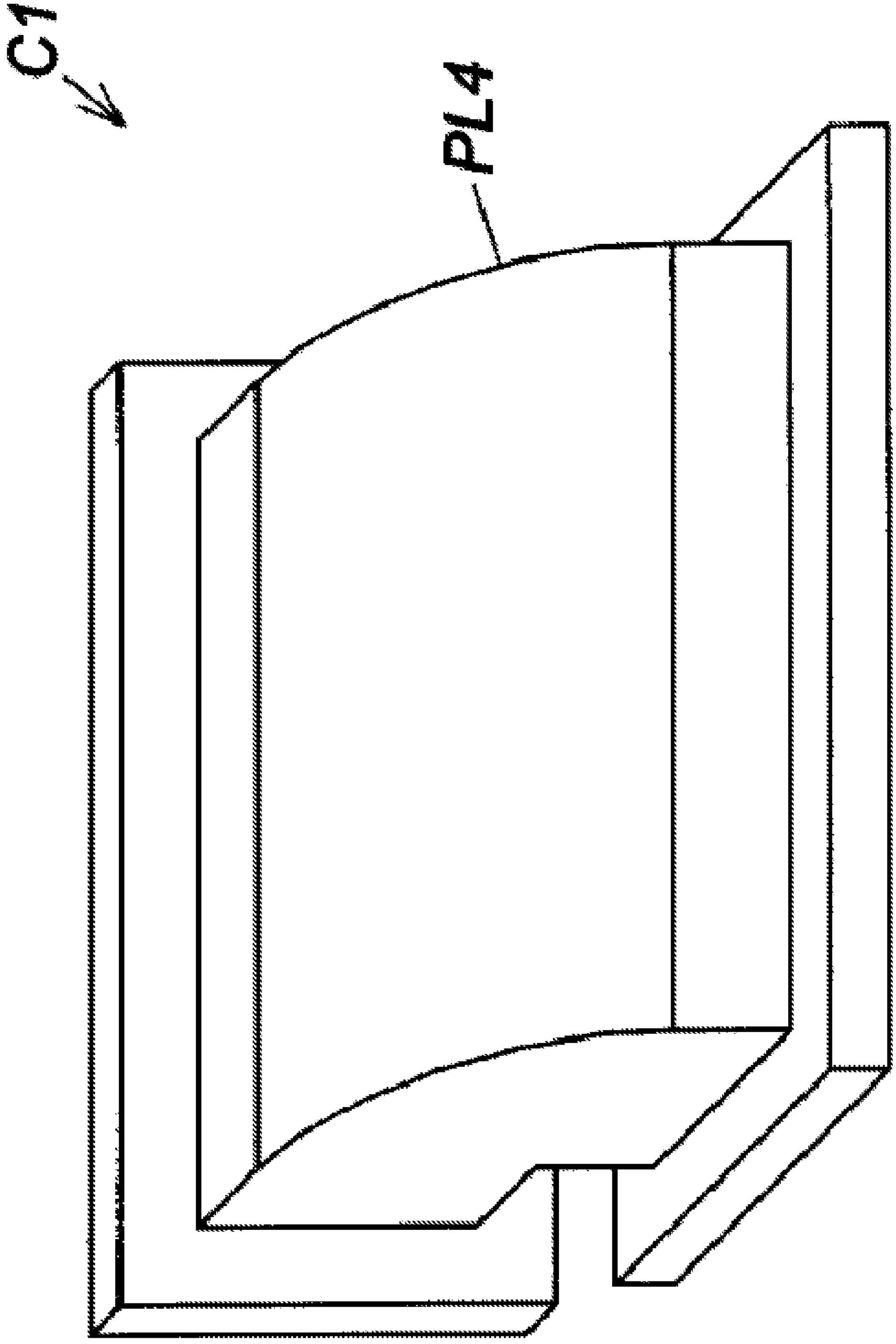
FIG. 11 is an explanatory diagram of pipe laying constituting the connecting portion between the first vacuum pump and a second vacuum pump.

In a positive displacement pump DP1 adopted as the second vacuum pump P2, rotors long in their rotating axis directions may be used as rotating bodies. In this case, the second vacuum pump P2 (positive displacement pump DP1) has a rectangular suction port 70, or a plurality of suction ports 70 is arranged in a line. Therefore, pipe laying PL4 having a shape shown in, for example, FIG. 11 is preferably adopted as the pipe laying PL4 in the exhausting system S2 in FIG. 8.

In the exhausting system S2 in FIG. 8 as well, the second vacuum pump P2 is installed near the first vacuum pump P1 as described above. Therefore, like the exhausting system S1 in FIG. 1, the environment inside the connecting portion C1 may be set to be an environment included in the vapor phase region below the vapor pressure curve of the condensable gas flowing through the inside of the connecting portion C1. As a result, the same function and effect as those of the exhausting system S1 in FIG. 1 are obtained.

In the exhausting system S2 in FIG. 8, the L-type pipe laying PL4 is adopted as the specific configuration of the connecting portion C1. However, when straight-type pipe laying PL5 shown in FIG. 9 is adopted as the connecting portion C1 instead of the L-type pipe laying PL4, a configuration in which the second vacuum pump P2 is installed near a position right below the first vacuum pump P1 may be adopted. A pressure loss caused by the fluid frictional resistance of gas in the straight-type pipe laying PL5 is smaller than that caused in the L-type pipe laying PL4. Therefore, the straight-type pipe laying PL5 is more suitable for taking the "measures against condensing gas in the present invention" described above.

The present invention is not limited to the above embodiments but may be modified in many ways by persons having ordinary knowledge in the filed concerned within the technological idea of the present invention.

The present invention describes an example in which the condensable gas changes its phase from gas to solid in the vapor pressure curve diagram in FIG. 2. However, the present invention also includes a case in which the condensable gas changes its phase from gas to liquid and a case in which the condensable gas changes its phase from gas to solid via liquid to be capable of producing the same effect.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. An exhausting system for exhausting a condensable gas, the exhausting system comprising:

a first vacuum pump comprising a turbomolecular pump comprising turbomolecular blades;

a second vacuum pump comprising a positive displacement pump comprising one or more rotating bodies; and a connecting portion defining a hole having one end at an outlet of the first vacuum pump and a second end at an inlet of the second vacuum pump;

wherein:

the first vacuum pump is positioned upstream of the second vacuum pump;

the turbomolecular blades form a blade exhausting mechanism that exhausts the gas with a rotor blade and a stator blade and the turbomolecular pump is structured so as not to have a drag pump mechanism;

the first vacuum pump has a rotor that rotates independently of all of the one or more rotating bodies of the second vacuum pump;

the first vacuum pump, the second vacuum pump and the connecting portion are connected and integrated by using bolts; and the connecting portion and the second vacuum pump are installed at a position relative to the first vacuum pump to provide a straight path for the condensable gas from at least one of the rotor blade and the stator blade to the inlet of the second vacuum pump.

2. The exhausting system according to claim 1, wherein the connecting portion is connected to the first vacuum pump or the second vacuum pump via vibration absorbing members.

3. The exhausting system according to claim 1, wherein exhaust gas passing through the connecting portion remains in a vapor phase without increasing a temperature inside the connecting portion.

4. The exhausting system according to claim 1, wherein the positive displacement pump has a heater for heating an inside of the positive displacement pump, a temperature sensor for measuring temperature inside the positive displacement pump, and a temperature controlling circuit.

5. The exhausting system according to claim 1, wherein the positive displacement pump has an inverter circuit and is capable of changing a rotational speed by the inverter circuit.

6. The exhausting system according to claim 1, wherein the positive displacement pump can operate at two rotational speeds.

7. The exhausting system according to claim 1, which has a structure in which a controlling circuit for at least one of the first vacuum pump and the second vacuum pump is accommodated in a housing and the housing is connected and integrated with at least one of the first or second vacuum pumps.

8. The exhausting system according to claim 7, wherein a thermal insulating means is provided between the first vacuum pump and the housing of the controlling circuit.

9. The exhausting system according to claim 1, wherein a third vacuum pump is arranged and connected downstream of the second vacuum pump.

10. The exhausting system according to claim 1, wherein exhaust gas passing through the second vacuum pump condenses inside of the second vacuum pump.

11. The exhausting system according to claim 9, wherein exhaust gas passing through a second connecting portion connecting the second vacuum pump with the third vacuum pump condenses inside of the second connecting portion.

12. The exhausting system according to claim 11, wherein one of a storing tank or a trap for trapping a condensed or coagulated gas component is provided at the second connecting portion connecting the second vacuum pump with the third vacuum pump.

* * * * *